United States Patent Office 2,798,105
Patented July 2, 1957

2,798,105

ISOMERIZATION OF N-BUTANE AND N-PENTANE

Heinz Heinemann and George Alexander Mills, Swarthmore, Pa., assignors to Houdry Process Corporation, Wilmington, Del., a corporation of Delaware No Drawing. Application April 5, 1954,
Serial No. 421,156

5 Claims. (Cl. 260—683.5)

The present invention relates to the catalytic isomerization of $C_4$ and $C_5$ hydrocarbons, particularly of n-butane and n-pentane, and is especially concerned with the production of isobutane and isopentane by isomerization of the corresponding normal hydrocarbons in the presence of a catalyst containing a metal of the platinum group and of free hydrogen under isomerizing conditions.

Isopentane is particularly valuable for use in upgrading gasolines to increase their octane numbers for use as aviation gasolines, and isobutane, in addition to its use as a high-octane volatility component, is of special importance in the alkylation of unsaturated hydrocarbons. It is, therefore, highly desirable to have a convenient and relatively inexpensive process for the isomerization of normal $C_4$ and $C_5$ hydrocarbons.

It has previously been proposed to isomerize n-pentane in the vapor phase over dual function catalysts, such as nickel on silica-alumina, molybdena-silica-alumina, and also over platinum-containing catalysts. While with the use of the molybdena-containing catalyst high selectivities and conversion rates appear to be obtainable, the use of this catalyst has the drawback that frequent regeneration of the catalyst is required. The platinum-containing catalysts, particularly platinum on alumina, on the other hand, are known to have a low coke-forming tendency. According to previously published reports, however, high pressures of about 1000 pounds per square inch gage (p. s. i. g.) at a temperature of about 800–900° F., liquid hourly space velocity of not more than 1, and a hydrogen to pentane mol ratio of about 3 are required for obtaining high conversion rates.

It has now been found that rates of conversion and selectivity at least as high as the best results given in the previously published literature are obtainable with the use of platinum catalysts in the presence of free hydrogen at more favorable conditions, particularly under substantially lower pressure and at higher space rate, if relatively very small amounts of halogen or substances yielding molecular halogen or forming hydrogen halide at reaction conditions are added to the reaction mixture. It has been ascertained that optimum results in this case are obtained with the use of pressures of about 100–200 pounds per square inch gage (p. s. i. g.), while the selectivity and also the conversion rate decrease with the use of higher pressures. Excellent results are obtained in this pressure range at space velocities as high as 4 volumes of liquid hydrocarbon per hour per volume of catalyst (4 v./v./hr.) at a temperature in the range of 600–900° F. and with a hydrogen to hydrocarbon mol ratio of 0.5–4. Conversions are then close to equilibrium yields and selectivities of 94% and better are obtained. Rather good results are obtainable even at space velocities rates of up to 10 v./v./hr. and more.

In addition to effecting the isomerization of n-pentane and n-butane under substantially lower pressures and at higher space velocities, the addition of halogen or halogen compounds has still another very favorable effect. It has been found that, while the addition of halogen and halogen compounds in the treatment of heavier hydrocarbons, such as naphtha boiling in the gasoline range, under reforming conditions and with platinum-alumina catalysts in the presence of free hydrogen increases the hydrocracking activity of the catalyst, hydrocracking and catalytic cracking are not only increased in the case of the treatment of n-butane and n-pentane, but are even substantially diminished or suppressed by the presence of added halogen or the like. Selectivity for isomerization is increased by the addition of halogen or halogen compounds.

It is, therefore, an object of the present invention to isomerize normal $C_4$ and $C_5$ hydrocarbons.

And it is a further object of this invention to isomerize normal $C_4$ and $C_5$ hydrocarbons over a catalyst containing a metal of the platinum group and in the presence of free hydrogen at elevated temperatures and pressures.

Another object of the present invention is the suppression of hydrocracking during the isomerization of $C_4$ and $C_5$ hydrocarbons.

Other objects and advantages of the invention appear from the following specification and the annexed claims.

With these objects in view, the present invention essentially consists of a process for the isomerization of n-butane and n-pentane by treating these hydrocarbons over a catalyst comprising alumina and a platinum metal in the presence of free hydrogen and with the addition of a relatively very small amount (in the range of about 0.001 to 0.5% based on hydrocarbon feed) of halogen or a suitable halogen compound at a temperature of about 600–900° F., a pressure of about 10–300 pounds per square inch gage (p. s. i. g.), a hydrogen to hydrocarbon mol ratio of about 0.1–10 to 1, and an hourly liquid hydrocarbon volume to catalyst volume space velocity of about 1–20.

Excellent conversion and selectivity, particularly in the case of the isomerization of normal pentane are obtained with the use of a temperature of about 725–850° F., a total pressure of 50–200 pounds per square inch gage (p. s. i. g.), a hydrogen to hydrocarbon mol ratio of about 0.5–2, and a space velocity of 4 volumes of liquid hydrocarbon per hour per volume of catalyst. Increase of conversion is caused by an increase in chlorine ion or other halogen ion concentration in the feed from 0.001% up to about 0.1% by weight, while beyond this point the conversion is approximately constant. A concentration of about 0.5% chlorine ion in the feed may still be used without substantial disadvantage. Selectivity with respect to isomerization reaches a maximum in the region between 0.005 weight percent and 0.05 weight percent of halogen ion concentration.

A catalyst well suited for the process of this invention may be prepared, for example, by acetic acid leaching of "activated" alumina, or from other forms of gamma or adsorptive alumina, preferably such of fairly high surface area, as, for example, precipitated alumina, and impregnation of such alumina with a soluble salt or complex of a noble metal of the platinum group or a colloidal solution of same, such as platinum or palladium, e. g., with a solution of chloroplatinic acid, palladium chloride, or nitrito, amino, and nitrito-amino complexes of platinum or palladium, employing that quantity and concentration of such solution which is required for depositing the desired amount of the noble metal on the alumina support. The impregnated alumina may then be heated to sufficiently high temperature or subjected to a reducing atmosphere to decompose the noble metal salt or complex, or the dried catalyst may be charged to a reactor and reduced therein by preliminary treatment with a hydrogen-containing gas stream such as during initial pressurizing of the reactor. Conversion and selectivity in the treatment of C₄ and C₅ hydrocarbons in accordance with the present process improve with increasing platinum concentration up to about 0.5% of the catalyst, though there seems to be relatively little difference in the use of catalysts containing 0.25% or 0.5% platinum or the like. Higher percentages of platinum or the like may be used in the catalyst, but will generally be of no advantage.

A certain limited amount of chloride or other halide may be contained in the catalyst material to be employed, from its preparation, e. g., 0.5% by weight of chlorine from impregnation with chloroplatinic acid. This, however, is not sufficient to bring about the effect of a substantial increase in selective isomerization in the treatment of normal pentane and butane under suitable conversion conditions, at least for the duration. A certain addition of halogen or halogen-giving compounds to the feed is required for attaining this result. In a short-term run for the conversion of n-pentane to iso-pentane over a catalyst comprising 99% alumina, 0.5% platinum and 0.5% chlorine at a pressure of 100 pounds per square inch gage ( p. s. i. g.), a temperature of 800° F., an hourly space velocity of 4 v./v./hr. and a mol ratio of hydrogen to pentane of 1:1, without the addition of chlorine ion to the charge, a total conversion of 49.5% and an isopentane selectivity of 88% was obtained. In contrast thereto, the conversion was increased to about 60.7% with an addition of 0.05% of chlorine ion to the charge, and the selectivity was increased to about 94.5% also in runs of long duration. With addition of 0.1% of chlorine ion to the charge, total conversion under the same isomerization conditions was further increased to about 64%, while the isopentane selectivity showed a small decrease to about 92.5%. On further increasing the chlorine ion addition above about 0.1%, total conversion as well as selectivity decreased slowly, becoming about 60.5% conversion and about 90% selectivity on 0.5% chlorine ion concentration in the charge.

The halogen ion may be added to the feed as free elemental gas or vapor, as hydrogen halide, or as a compound capable of releasing free halogen or hydrogen halide under the working conditions. Examples of suitable halogens and halogen compounds include free chlorine, fluorine and other elemental halogen gases and vapors, hydrogen chloride and other hydrogen halide vapors, alkyl halides such as chloroform, carbon tetrachloride, and the like. Convenient compounds giving highly successful results are the alkyl halides, such as tertiary butyl chloride and n-butyl iodide.

Best isomerization results are obtained with the use of substantially or approximately pure n-pentane or n-butane feeds; the process in accordance with the present invention, however, is still useful and advantageous with the use of feeds which beside the C₅ and C₄ hydrocarbons contain certain amounts of other hydrocarbons. While the admixture of large percentages of higher hydrocarbons, such as naphtha, has a damaging effect on the process by causing other reactions which inhibit or suppress the isomerization of the n-pentane and/or n-butane, it is possible to have small percentages of such higher hydrocarbons with n-pentane and/or n-butane, and may even be of some advantage in that part of the hydrogen required in the process may be furnished thereby. Naphthas rich in naphthenes are particularly well suited for this purpose. Thus, up to about 5% of other aliphatic, cyclo paraffinic, or even aromatic hydrocarbons are admissible in the charge stock without substantially damaging the catalyst activity for isomerization. The admixture of still smaller amounts of naphthas rich in naphthenes (e. g., 2% of the feed) can be useful for furnishing by dehydrogenation at least part of the very small hydrogen requirements of the process. The presence in the charge stock of n-pentenes and/or n-butenes, respectively, will not be damaging, though the isomerization of these unsaturated hydrocarbons may easily be carried out without the use of a platinum-containing catalyst. In the presence of a sufficient amount of free hydrogen in the reaction mixture, such unsaturated hydrocarbons will be transformed into saturated compounds during the process.

While mixtures of n-pentane and n-butane may be treated in accordance with the new process, it will generally be advisable to treat them separately where it is desired to make use of the isomerized compounds separately and not as a mixture.

Relatively low pressures are useful for the new isomerization process. Optimum conversion (about 60–64% total conversion) is obtained in accordance with the new process at about 800° F. and a space rate of 4 v./v./hr. on working under a pressure of around 100 pounds per square inch gage (p. s. i. g.). In comparison, in the reforming of hydrocarbon mixtures containing paraffins and naphthenes, such as straight run or natural gasolines, over a supported platinum catalyst with the addition of small amounts of a chloride to the feed and at a temperature of 890–910° F., with a space rate of 2 v./v./hr., and a hydrogen to hydrocarbon mol ratio of about 3, a pressure of 500 pounds per square inch gage (p. s. i. g.) has been recommended, and a pressure of 950 pounds per square inch gage (p. s. i. g.) has been proposed for the isomerization of n-pentane, without addition of halogen or the like to the feed, over a supported platinum catalyst at a temperature of about 810° F. with a hydrogen to pentane ratio of about 3 and a space rate of only 1 v./v./hr.

*Example I*

Technical grade n-pentane containing, according to mass spectographic analysis, 97.4% n-pentane and 2.6% isopentane was passed with addition of hydrogen in an amount of 1:1 mol and of 0.05% chlorine ion as tertiary butyl chloride over a catatlyst containing 0.5% platinum and supported on activated alumina, at a total pressure of 100 pounds per square inch gage (p. s. i. g.), an hourly space velocity of 4 v./v./hr. and at a temperature of about 800° F. Conversion of 60.7% with an isomerization selectivity of 94.5% was obtained per pass (at thermodynamic equilibrium under such conditions a yield of 61.5% would be obtained). At a temperature of about 900° F. under otherwise equal conditions, conversion of 62.8% was obtained, but the selectivity had decreased to 84.2%.

If, instead of a liquid hourly space rate of 4 v./v./hr., a space rate of 10 v./v./hr. was employed under otherwise equal conditions, the total conversion decreased to about 47.2%, but the selectivity increased to about 95.3%.

While essentially equal results may be obtained on increasing the pressure up to about 200 pounds per square inch gage (p. s. i. g.), selectivity and conversion decrease with further increase of pressure. On decreasing the pressure substantially below 100 pounds per square inch gage (p. s. i. g.), both selectivity and conversion begin to decrease, too, until at atmospheric pressure a fairly low level (40.6% conversion and 77.2% selectivity at a temperature of 700° F.) is reached.

Since even at thermodynamic equilibrium of the reaction at temperatures of about 750 to 900° F., where the reaction goes fast enough for practical and economic purposes, the yields of isopentane cannot be higher than 55–65% per pass, it may be desirable to fractionate the isomerization product and recycle the separated unchanged n-pentane. The thus recovered isopentane (99.5 blending octane) may then be used for gasoline blending or other desired purpose.

*Example II*

An equimolecular mixture of n-pentane (42 vol. percent) and an East Texas naphtha boiling between 180° and 375° F. (58 vol. percent) and containing approximately 48% paraffins, 40% naphthenes and 12% aromatics was charged together with 0.05% of chlorine ion in the form of tertiary butyl chloride and 4 mols of hydrogen per mol of hydrocarbon to a catalyst containing approximately 99.0% alumina, 0.5% platinum and 0.5% chlorine, at a temperature between 875° and 900° F., a pressure of 300 pounds per square inch gage (p. s. i. g.), and a total liquid hourly space rate of 4 v./v./hr. The normal to iso ratios of pentanes in the product obtained and the distribution of these compounds are shown in the following table and are compared therein with results obtained under similar conditions but in the absence of naphtha, i. e., with a feed of n-pentane containing halide only. These comparative results show that isomerization of n-pentane by the present process is effected to a substantially higher percental degree with a feed of technical grade n-pentane only than with an equimolar mixture of n-pentane and naphtha.

| Feed | 875° F. | | 900° F. | |
|---|---|---|---|---|
| | Pentane+ Naphtha+ 0.05% Cl | Pentane+ 0.05% Cl | Pentane+ Naphtha+ 0.05% Cl | Pentane+ 0.05% Cl |
| n/i pentane ratio | 1.8 | 1.0 | 2.0 | 1.1 |
| Percent n-C5 | 64.1 | 50.8 | 66.5 | 51.6 |
| Percent i-C5 | 35.9 | 49.2 | 33.5 | 48.4 |

*Example III*

A mixture of 98% by volume of n-pentane and 2% by volume of an East Texas naphtha having the characteristics described in Example II was blended with tertiary butyl chloride in an amount sufficient to obtain 0.05% of chlorine ion in the mixture. This mixture was passed at a temperature of 900° F., a pressure of 100 pounds per square inch gage (p. s. i. g.), a liquid hourly space rate of 4 v./v./hr., and a hydrogen to hydrocarbon ratio of 1:1 mols over a catalyst of the type named in Examples I and II. The table given below shows the comparative results in conversion and selectivity obtained in this case and in the case of working under otherwise similar conditions with commercially pure n-pentane containing tertiary butyl chloride only. It demonstrates that, while in the case of a 2% admixture of naphtha the conversion ratio is not as high as in the treatment of technical grade n-pentane only, it is nevertheless high enough to make the process attractive for the treatment of mixtures of this type.

| | 98% n-C5+ 2% Naphtha+ 0.05% Cl | n-C5+ 0.05% Cl |
|---|---|---|
| Conversion, Percent | 58 | 63 |
| Selectivity, Percent | 81 | 84 |
| n/i C5 ratio | 0.89 | 0.69 |

*Example IV* n-Butane was charged together with hydrogen in a molar ratio of 1:1 to a catalyst of the same composition as used in the preceding examples and prepared by impregnation of acetic acid leached alumina with chloroplatinic acid solution with subsequent heat treatment and reduction by hydrogen. Tertiary butyl chloride was dissolved in the feed to an extent of 0.05% of chlorine ion based on the butane. The reaction was carried out at a temperature of 800° F., a pressure of 100 pounds per square inch gage (p. s. i. g.), and a liquid hourly butane space rate of 4 v./v./hr. According to the analysis of the effluent stream, a conversion of 38% with a selectivity of 88% of normal butane to isobutane was obtained, or an isobutane yield of 33.4% per pass. This is to be compared with a theoretically possible 36% based on thermodynamic considerations and, therefore, constitutes 93% of the theoretical yield.

Obviously, many modifications and variations of the invention as hereinbefore set forth may be made without departing from the spirit and scope thereof, and therefore only such limitations should be imposed as are indicated in the appended claims.

I claim:
1. The process of isomerizing a feed selected from the class consisting of aliphatic butanes and aliphatic pentanes, said feed containing not more than about 5% by volume hydrocarbons having more than 5 carbon atoms in the molecule, comprising treating said feed over a catalyst containing metal of the platinum group on an alumina support, in the presence of free hydrogen at a temperature in the range of about 600° F. to 900° F., at a pressure in the range of about 10 to 300 pounds per square inch gage, at a hydrogen to hydrocarbon mol ratio in the range of about 0.1 to 10, an hourly liquid hydrocarbon volume to catalyst volume space velocity in the range of 1 to 20, and with addition to the feed of a relatively very small amount of a member of the group of halogen substances that are capable of providing hydrogen halide under the operating conditions.

2. The process of isomerizing a feed comprising selecting a feed from the class consisting of aliphatic butanes and aliphatic pentanes, said feed containing not more than about 5% by volume hydrocarbons having more than five carbon atoms in the molecule, treating said feed over a platinum-alumina catalyst in the presence of free hydrogen at a temperature in the range of about 725° to 850° F., a pressure in the range of about 100 to 200 pounds per square inch gage, a hydrogen to hydrocarbon mol ratio in the range of about 0.5 to 2, an hourly liquid hydrocarbon volume to catalyst volume space velocity of about 4, and with addition in the range of 0.001 to 0.5% of halogen in the form of a member of the group of halogen substances that are capable of providing hydrogen halide under the operating conditions.

3. The process of isomerizing feedstocks selected from the class consisting of substantially pure aliphatic butanes and substantially pure aliphatic pentanes consisting of mixing the purified feedstock with from about 0.001 to about 0.5% hydrogen chloride and with from about 0.1 to about 10 mols of hydrogen per mol of feedstock, passing said mixture at a pressure within the range from about 10 to about 300 pounds per square inch gage at a temperature of from about 600° F. to about 900° F. over a hydroisomerization catalyst consisting predominantly of alumina and containing a minor amount of chloride and a minor amount of metallic platinum at a liquid hydrocarbon space velocity between about 1 and about 20, withdrawing and cooling the gaseous mixture and separating a liquid hydrocarbon mixture having an isomer distribution significantly different from that of the feedstock.

4. The process in accordance with claim 3 wherein an amount of about 0.05% of chlorine in the form of an alkyl chloride is added to the feed.

5. The method of claim 3 in which the pressure is 100 to 200 pounds per square inch gage, the temperature is 725 to 850° F., the H2/HC ratio is 0.5 to 2, the space velocity is 4 to 5 and the catalyst contains 0.25 to 0.5% Pt and 0.25 to 0.5% Cl resulting from impregnation of chlorplatinic acid into acetic acid leached activated alumina.

References Cited in the file of this patent
UNITED STATES PATENTS

| 2,479,109 | Haensel | Aug. 16, 1949 |
| 2,629,683 | Haensel | Feb. 24, 1953 |
| 2,642,383 | Berger et al. | June 16, 1953 |
| 2,642,384 | Cox | June 16, 1953 |

FOREIGN PATENTS

| 487,392 | Canada | Oct. 21, 1952 |

OTHER REFERENCES

"Chemical Technology of Petroleum" (Gruse et al.), Publ. by McGraw-Hill Book Co., (New York), 1942, pages 36–37 relied on.